United States Patent [19]

Benninger et al.

[11] 3,909,059

[45] Sept. 30, 1975

[54] FLOOR AND FRAME CONSTRUCTION FOR FLAT TRAILERS

[75] Inventors: Arthur C. Benninger, Seneca; Meletus I. Long, Brookville, both of Pa.

[73] Assignee: Ti-Brook, Inc., Brookville, Pa.

[22] Filed: Jan. 16, 1974

[21] Appl. No.: 433,723

[52] U.S. Cl.................. 296/28 M; 52/464; 52/471; 105/422
[51] Int. Cl.² ........................................ B62D 27/06
[58] Field of Search .......... 296/1 F, 28 M; 105/375, 105/422; 52/463, 464, 471

[56] References Cited
UNITED STATES PATENTS

| | | | |
|---|---|---|---|
| 1,379,882 | 5/1921 | Swartz............................... | 296/28 M |
| 1,661,750 | 3/1928 | Dunbar................................ | 52/464 |
| 2,962,133 | 11/1960 | Kivett et al. .......................... | 52/463 |
| 3,080,021 | 3/1963 | Muir................................ | 296/28 M |
| 3,420,025 | 1/1969 | Portz................................ | 105/422 |

FOREIGN PATENTS OR APPLICATIONS

| | | | |
|---|---|---|---|
| 551,714 | 10/1956 | Belgium.............................. | 105/422 |

Primary Examiner—Robert J. Spar
Assistant Examiner—Gary Auton
Attorney, Agent, or Firm—Webb, Burden, Robinson & Webb

[57] ABSTRACT

A floor construction for placement on the main frame of a load carrying vehicle including a plurality of longitudinally extending panel members preferably of extruded aluminum, positioned in side by side spaced apart relationship on the main frame. The panel members have a load bearing surface and a pair of leg portions downwardly extending on opposite longitudinal sides of the load bearing surface. The leg portions terminate in an outwardly extending lateral flange which has an upper bearing surface and a lower bearing surface contacting the main frame of the vehicle. A plurality of longitudinally extending channel members are positioned between adjacent pairs of panel members. The channel members include a generally horizontal upper surface extending between adjacent panel members and a pair of locking webs downwardly extending on opposite longitudinal sides of the upper surface. The locking webs seatably engage the upper bearing surface of the lateral flanges of adjacent panel members whereby lateral movement between adjacent panel members is prevented. Also disclosed is a vehicle frame construction suitable for use in combination with the disclosed floor structure.

8 Claims, 5 Drawing Figures

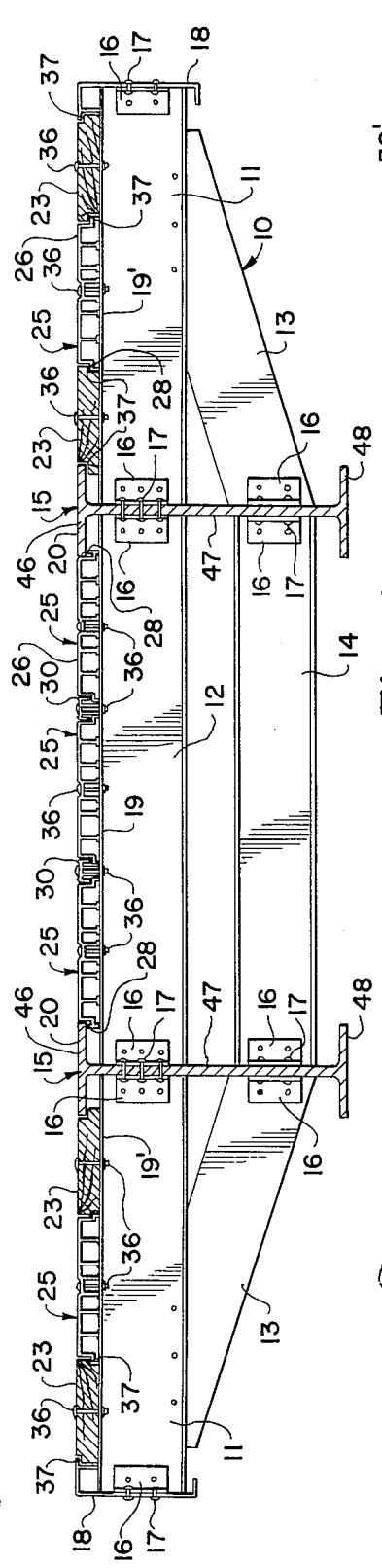
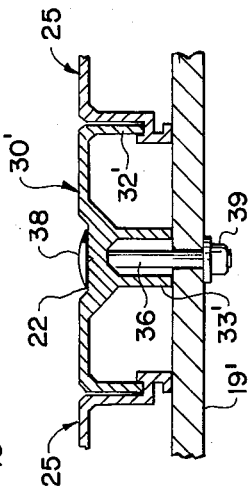
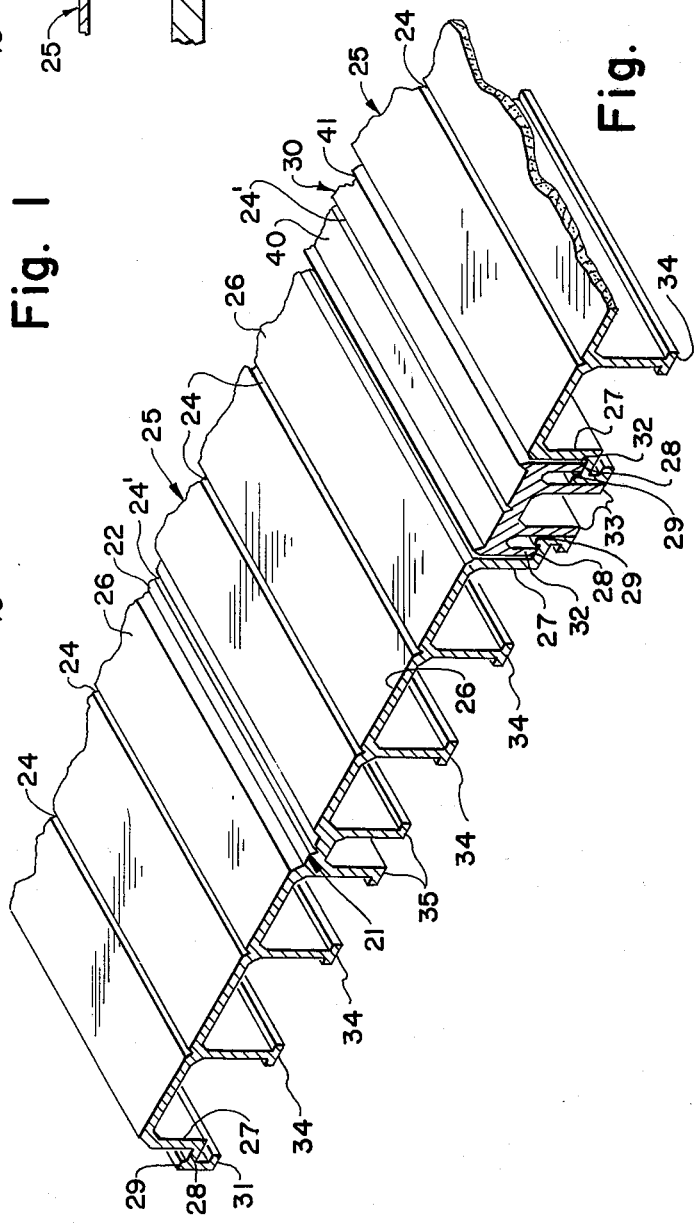

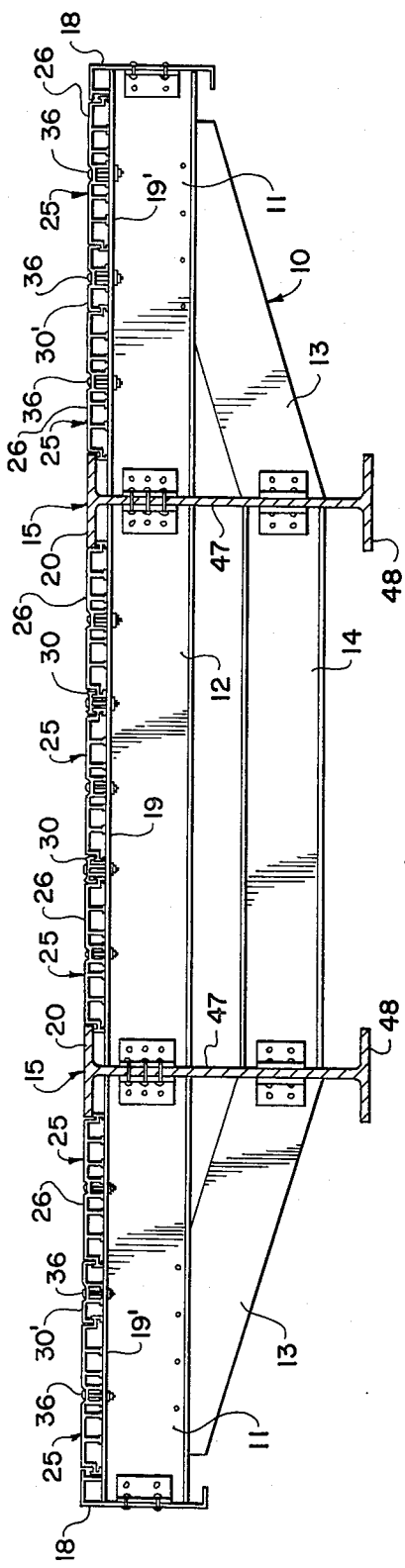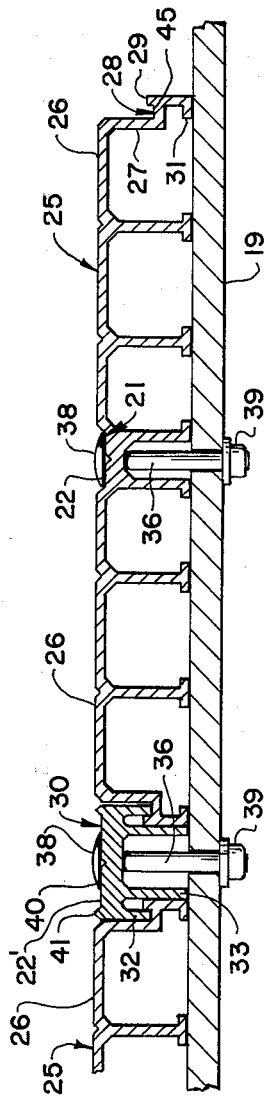

FLOOR AND FRAME CONSTRUCTION FOR FLAT TRAILERS

Our invention relates generally to load carrying vehicles and more particularly to vehicle floor and frame constructions of the type used on trailers, railroad cars, and like freight hauling vehicles.

In the design and construction of load supporting floors for trailers and like vehicles, several features are desired. The floor should preferably be rigid and resistant to sagging and yet it should be lightweight so as to maximize the payload capacity of the carrier. At the same time, the floor should be level and smooth in order to minimize the problem of load shifting during transport and also to aid in loading and unloading operations. It is, likewise, desirable to have a construction which is easily assembled and also which utilizes few parts so as to minimize inventory problems. From the trailer builders point of view, it is, likewise, desirable to have a floor construction in which custom floor designs can be constructed without appreciable difficulty. Finally, the floor should be capable of being easily repaired if a section becomes damaged during use. In this regard, it is desirable that only the damaged section be replaced rather than the entire floor or a substantial portion thereof.

Prior attempts have been made in an effort to achieve the above desired properties, but these attempts have not proved completely successful. These prior floor constructions are either quite complex and require an excessive number of parts and corresponding assembly labor, or they are limited to a fixed design which does not readily lend itself to modifications as is required in custom floor building.

Our invention solves the problems heretofore encountered by providing a floor constructioin for load carrying vehicles which is rigid and lightweight utilizing a minimum number of parts which are easily assembled and which are further interchangeable so as to permit custom floor constructions with minimum inventory. Our invention further provides a floor construction which may be easily repaired by removing damaged sections without disassembling substantial portions of the floor.

Our invention further provides a combined frame and floor structure in which the upper flanges of the main I-beams of the frame form a portion of the floor.

Briefly, our invention provides a floor construction for placement on the main frame of a load carrying vehicle, including a plurality of longitudinally extending panel members positioned in side by side spaced apart relationship on the main frame of the vehicle. The panel members have a load bearing surface disposed in parallel spaced relationship to the frame, and a pair of leg portions downwardly extending on opposite longitudinal sides of the load bearing surface. The leg portions terminate in an outwardly extending lateral flange having an upper bearing surface and a lower bearing surface contacting the main frame of the vehicle. The lateral flange also includes an upwardly extending shoulder portion at the outermost edge of the flange upper bearing surface. A plurality of longitudinally extending channel members are each lockably positioned between adjacent pairs of panel members. The channel members include an upper surface extending between adjacent panel members and a pair of locking webs downwardly extending on opposite longitudinal sides of the upper surface seatably engaging the upper bearing surfaces of the lateral flanges of adjacent panel members, whereby, lateral and vertical movement between adjacent panel members is prevented. The channel members and panel members are secured to the vehicle frame by appropriate means, preferably, headed lock bolts. The floor construction may also include a plurality of longitudinally extending wooden floor planks, generally rectangular in cross-section and having a thickness substantially equal to that of the panel members. The wooden plank members have longitudinally extending cut-out portions formed on diagonally opposite corners thereof each cut-out having a height substantially equal to that of the flange portions of the panel members, whereby the plank members are adapted to matingly engage adjacent flanges of the panel members. Also disclosed herein is a vehicle frame construction particularly suited for use in combination with the disclosed floor construction. The frame construction includes a pair of main I-beams positioned in parallel spaced apart relationship having horizontal upper and lower flange portions and a vertically disposed web portion interconnecting said flanges. A plurality of central brace members are secured to and between the web portions of the main I-beams in longitudinally spaced apart relationship therealong. The upper surfaces of the central brace members being positioned below the upper flanges of the main I-beams. A plurality of outboard brace members are secured to and outwardly extend from opposite side web portions of the main I-beams in longitudinally spaced apart relationship therealong, the upper surfaces of said outboard brace members being positioned below the upper flanges of the main I-beams. The above disclosed panel members are positioned on the upper surfaces of the central brace members and outboard brace members of the main frame. Those panel members abutting the main I-beams have their respective lateral flange portions positioned beneath the upper flanges of the main I-beams whereby the load bearing surfaces of the panel members are substantially flush with the upper flanges of the main I-beams. Adjacent panel members are interconnected by way of the above disclosed channel members, the locking webs of the channel members positioned upon the lateral flanges of adjacent panel members in order to prevent lateral movement between the panel members.

Various other features, objects, and advantages of the floor and frame construction of our invention will either be specifically pointed out or become apparent when, for a better understanding of the invention, reference is made to the following description taken in conjunction with the accompanying drawings illustrating several preferred embodiments of the invention.

In the drawings:

FIG. 1 is a transverse sectional view of the trailer frame and one presently preferred embodiment of the floor construction in place thereon;

FIG. 2 is a fragmentary perspective view of two panel members and a channel member lockably positioned therebetween;

FIG. 2a is a partial transverse sectional view showing two adjacent panel members interconnected by a modified channel member;

FIG. 3 is a transverse sectional view similar to FIG. 1 with another presently preferred embodiment of the floor construction secured to the trailer frame; and FIG. 4 is a partial transverse sectional view showing adjacent panel members interconnected by a channel member and secured to the trailer frame by headed lock bolts.

One presently preferred embodiment of the floor and frame construction of our invention is depicted in FIG. 1. The embodiment of FIG. 1 is particularly suited for use in the construction of flat bed trailers. The trailer main frame 10 includes a pair of longitudinally extending main beams 15 positioned in parallel spaced apart relationship. Beams 15 have a horizontally disposed upper flange 20 and a horizontally disposed lower flange portion 48. Main beams 15 also include a vertically disposed web portion 47 interconnecting horizontal flanges 20 and 48. A plurality of C-shaped central brace members 12 each having an upper horizontal flange portion 19 are secured to and between web portions 47 of main beams 15 in longitudinally spaced apart relationship along beams 15. Upper flanges 19 of central brace members 12 are positioned below upper flanges 20 of beams 15 in spaced apart relationship therefrom. Main frame 10 also includes a plurality of C-shaped outboard brace members 11 secured to and outwardly extending from opposite side web portions 47 of beams 15 in longitudinally spaced apart relationship therealong. Upper horizontal flanges 19' of outboard brace members 11 are positioned below upper flanges 20 of I-beams 15 a distance equal to that of the spacing between upper flanges 19 of central brace members 12 and upper flanges 20. Main frame 10 may also include a plurality of lower central support channels 14 secured to and between vertical web portions 47 of beams 15 in longitudinally spaced apart relationship therealong, positioned below central brace members 12. Main frame 10 may also include a plurality of lower outboard support channels 13 secured at one end to vertical web portion 47 of beams 15 longitudinally spaced therealong and having their outermost ends secured to the lower portions of outboard channels 11. Main frame 10 also includes a pair of longitudinally extending side channels 18 secured to the outermost ends of outboard channels 11. Main beams 15, central brace members 12, outboard brace members 11 and the remaining structural elements of frame 10 are all preferably constructed of aluminum alloy in order to achieve a high strength to weight ratio. Main beams 15 also preferably contain a positive longitudinal camber or humpback bow which permits beams 15 to resist excessive downward flexing when the trailer is transporting a heavy load.

As shown in the drawings, outboard channels 11 and central channels 12 are secured to main beams 15 by way of brackets 16 and conventional headed lock bolts 17. Of course, it is understood that other convention securement means may be employed. For example, channels 12 and 11 could be separately welded or riveted to main beams 15 in conventional fashion. Channels 11 and 12 could also be a unitary piece extending the full width of the trailer in which case beams 15 would be pre-slotted and the unitary channel would be inserted within the slots and then welded. Likewise, side channels 18 may be secured to the outermost ends of outboard channels 11 by brackets 16 and headed lock bolts 17, FIG. 1, or they may be weldably secured thereto.

A plurality of longitudinally extending panel members 25 are positioned in side by side spaced apart relationship on upper flanges 19 and 19' of main frame 10. Panel members 25 are preferably extruded aluminum alloy and extend the entire length of the trailer frame. Panel members 25 include an upper load bearing surface 26 disposed in parallel spaced relationship to upper flanges 19 and 19' of main frame 10. Panel members 25 also each have a pair of leg portions 27 depending downwardly on opposite longitudinal sides of load bearing surface 26. Leg portions 27 terminate in an outwardly extending lateral flange 28 which has an upper bearing surface 45 formed in parallel spaced relationship to load bearing surface 26, and a lower bearing surface 31 contacting upper flange 19 of main frame 10, FIG. 4. Lateral flanges 28 also include an upwardly extending shoulder portion 29 at their outermost edges. Panel members 25 also include a plurality of longitudinally extending support webs 34 depending downwardly from load bearing surface 26 intermediate leg portion 27 in spaced apart relationship therebetween. Support webs 34 are of a length substantially equal to that of leg portions 27 whereby webs 34 contact upper flanges 19 or 19' of main frame 10 when panel members 25 are in peace thereon. Upper bearing surface 26 of panel members 25 may also include a plurality of longitudinally extending grooves 24 which serve to lower the coefficient of sliding friction between the floor and the payload.

The floor construction also includes a plurality of longitudinally extending channel members 30 lockably positioned between adjacent pairs of panel members 25. Channel members 30 are also preferably extruded alumimum alloy. Channel members 30 each have an upper load bearing surface 40 extending between adjacent panel members 25 and a pair of locking webs 32 downwardly extending on opposite longitudinal sides of upper surface 40. The terminal ends of locking webs 32 seatably engage upper bearing surfaces 45 of lateral flanges 28 of adjacent panel members 25 whereby lateral and vertical movement between adjacent panel members is prevented due to the interference between locking webs 32 and bearing surfaces 45, legs 27 and shoulder portion 29, see FIG. 4. The width of bearing surface 45 of flanges 28 may be slightly greater than the thickness of locking webs 32 so as to allow for possible tolerance variations in the transverse dimensions of main frame 10. Channel members 30 may also include a pair of support webs 33 depending downwardly from upper surface 40 in spaced apart relationship intermediate locking webs 32. Support webs 33 extend a greater length than locking webs 32 whereby webs 33 contact upper flanges 19 or 19' of main frame 10 when locking webs 32 are in bearing contact with lateral flanges 28 of adjacent panel members 25, FIGS. 2 and 4.

Referring to FIG. 4, panel members 25 and channel members 30 are secured to upper flanges 19 of main frame by way of conventional headed fasteners 36. Headed fasteners 36 are preferably of the lock bolt variety having a head 38 and a swagable nut 39 secured to the shank portion of the fastener.

Referring still to FIG. 4, channel members 30 may also have an upper surface 40 which includes offset portion 22 positioned downwardly from and parallel to load bearing surface 26 of panel members 25. Upper surfaces 40 of channel members 30 also preferably include raised portions 41 longitudinally extending on opposite sides thereof substantially flush with upper surface 26 of panel members 25. Offset surface 22 permits a lower seating of headed lock bolts 36 whereby head portions 38 are substantially flush with upper surfaces 26 of panel members 25. Hence, head portions 38 of lock bolts 36 are not protruding above load bearing surface 26 which yields a smooth floor thus permitting easy loading and unloading of freight thereon.

Load bearing surfaces 26 of panel members 25, likewise, each include intermediate surface portion 22 formed along the longitudinal center line of panel members 25 extending the entire length thereof. Intermediate surface portions 22 are offset downwardly from and parallel to load bearing surface 26 a distance substantially equal to that of the thickness of head portion 38 of lock bolts 36. Hence, head portions 38 are substantially flush with upper load bearing surface 26 when lock bolts 36 are secured therein, also yielding a smooth floor construction free of any protrusions. Offset surface portion 22 of channel member 30 also preferably includes alignment groove 24' formed therein and extending the length of channel member 30. alignment groove 24' is positioned substantially at the longitudinal center line of channel member 30 midway between support webs 33. Since alignment groove 24' is positioned at the center line of channel member 30, it provides a convenient guide during fabrication of the floor in that the bolt holes which are drilled through channel member 30 are automatically aligned at the center line of channel member 30 when the drill bit is positioned along alignment groove 24'. Offset surface portions 22 of intermediate fastening portion 21 of panel members 25, likewise, contain an alignment groove 24' extending the length of panel members 25 and positioned substantially at the longitudinal center line of intermediate surfaces 21.

During fabrication of the floor, the panel members 25 are first laid in position on upper flanges 19 and 19' of main frame 10. Channel members 30 are then positioned between adjacent panel members 25. A chalk line may then be snapped across the entire width of the trailer striking upper surfaces 26 of panel members 25 and upper surfaces 40 of channel members 30 at longitudinally spaced intervals coinciding with each set of brace members 11 and 12. Bolt holes are then drilled through the panel members 25 and channel members 30 at the points of intersection between the chalk lines and alignment grooves 24'. The bolt holes are drilled through the panel members 25 and channel members 30 and upper flanges 19 and 19' of main frame 10. Headed lock bolts 36 are then inserted into the bolt holes and nut portions 39 are then swaged in place in the conventional manner.

Our invention provides a floor construction for trailers and like load carrying vehicles which permits the custom construction of various floor designs with a minimum of parts. For example, the construction of FIG. 1 comprises a plurality of aluminum floor sections and a plurality of wooden floor sections while the construction depicted in FIG. 3 is entirely of aluminum floor sections. Referring specifically to the floor construction of FIG. 1, three panel members 25 are positioned on upper flanges 19 of central brace members 12 and interconnected by two channel members 30. Those panel members 25 adjacent main beams 15 have their respective lateral flange portions 28 positioned beneath upper flanges 20 of beams 15. Flange portions 28 of panel members 25 are spaced approximately 1/16 inch beneath upper flange 20 in order to assure a snug sliding fit. Panel members 25 are of a thickness substantially equal to the spacing between upper flanges 19 of central brace members 12 and upper flanges 20 of beams 15 so that upper load bearing surface 26 is substantially flush with the surface of upper flanges 20. Hence, upper flanges 20 of main beams 15 form a portion of the load bearing surface of the floor construction thus eliminating the need for additional flooring sections covering the area over beams 15. Disposed over upper flanges 19' of outboard brace members 11 of FIG. 1 is a pair of wooden plank members 23. Wooden plank members 23 are generally rectangular in cross-section and have a thickness substantially equal to that of panel members 25. Plank members 23 also have longitudinally extending cut-out portions 37 formed on diagonally opposite corners thereof, cut-out portions 37 having a height substantially equal to that of flange portions 28 of panel members 25. The plank members 23 positioned immediately adjacent main beams 15 engage the outboard lateral flange 20 with cut-out portions 37 in the same manner as previously described for panel members 25. A panel member 25 is positioned on each outboard brace member 11 intermediate wooden plank members 36 such that cut-out portions 37 engage flange portions 28 of the panel member. Wooden plank members 23, likewise, are drilled to receive bolt holes and headed lock bolts 36 therethrough.

Some trailer purchasers specify that the floor contain wooden planks spaced in a particular relationship relative to the aluminum panel members. In these applications the wooden plank members 36 of FIG. 1 serve as a securement means for nailing freight hold down blocks thereto. In other applications, a purchaser may specify that the floor be all aluminum of the type depicted in FIG. 3.

The all-aluminum embodiment of FIG. 3 utilizes three panel members 25 secured to upper flanges 19 of central brace members 12 interlocked by two channel members 30. The opposed outboard sections of the floor each comprise a pair of panel members 25 interlocked by modified channel member 30' of FIG. 2a. Modified channel member 30' has a greater transverse width than that of previously described channel member 30 in order to accommodate the increased spacing between the outboard panel members 25 of FIG. 3. Modified channel member 30' also includes an upper surface having an offset portion 22 which provides a flush fit with head 38 of lock bolt 36. Modified channel member 30', likewise, includes a pair of locking webs 32' which lockably engage flanges 28 of adjacent panel members 25. Member 30' also has a pair of support webs 33' extending downwardly from the upper surface to supportably engage flange 19' of main frame 10.

Hence, it can be appreciated that an all-aluminum floor or a combined aluminum and wooden floor may be custom built to fit the particular needs of the customer without the necessity of stocking a great number of flooring elements. The floor constructions of FIGS. 1 and 3 require an inventory of only four elements, namely, panel members 25, plank members 23, channel members 30 and modified channel members 30'. Headed lock bolts 36 would be of identical size in both constructions.

If any of the flooring elements 23, 25, 30 or 30' become damaged during use, they may be individually removed by simply removing nut portions 39 from their respective lock bolts 36. The damaged element may then be removed and replaced with a new element and secured to flange 19 or 19' with new lock bolts 36. Hence, in our floor construction only the damaged element need be removed and replaced eliminating the added labor and expense of removing and replacing a substantial portion of the floor as is necessary in other prior constructions.

We claim:

1. A floor construction for placement on the main frame of a load carrying vehicle, including:

A. a plurality of longitudinally extending panel members positioned in side-by-side, spaced apart relationship on said main frame, said panel members each having an upper load bearing surface disposed in parallel spaced relationship to the frame, each of said panel members also having a pair of leg portions downwardly extending on opposed longitudinal sides of the load bearing surface, each of said leg portions terminating in an outwardly extending lateral flange, said flanges having an upper bearing surface formed in parallel spaced relationship to the load bearing surface of the panel members and a lower bearing surface contacting the main frame of the vehicle, said lateral flanges also including an upwardly extending shoulder portion at the outermost edge of the upper bearing surface thereof;

B. a plurality of longitudinally extending channel members positioned between adjacent pairs of panel members, said channel members each having an upper surface extending between adjacent panel members and forming a portion of the load bearing surface of said floor and each channel member including a pair of locking webs downwardly extending on opposite longitudinal sides of the upper surface seatably engaging the upper bearing surfaces of the lateral flanges of adjacent panel members, whereby, lateral movement between said adjacent panel members is prevented, each of said channel members also includes a pair of support webs, depending downwardly from the upper surface of the channel member in spaced apart relationship intermediate the locking webs of said channel member, and extending a greater length than said locking webs, whereby, said support webs contact the vehicle frame when said locking webs are in bearing contact with the lateral flanges of adjacent panel members; and C. fastening means extending through the upper surface of the panel members and the channel members for securing said members to the vehicle frame whereby longitudinal movement of said members is prevented, wherein the securement means includes a plurality of headed fasteners extending through the upper surface of said panel and channel members and lockably secured to the vehicle frame 2. The vehicle floor construction of claim 1 wherein the panel members also include a plurality of longitudinally extending support webs, said webs depending downwardly from the load bearing surface intermediate the leg portions in spaced apart relationship, said webs having a length substantially equal to that of the leg portions, whereby, the webs contact the vehicle frame when the panel members are secured thereto.

3. The vehicle floor construction of claim 1 wherein the load bearing surface of said panel members includes an intermediate surface portion formed along the longitudinal center line of said panel member and extending the entire length thereof, said intermediate surface portion being offset downwardly from and parallel to the load bearing surface, said channel members also having an upper surface which includes an offset surface portion positioned downwardly from and parallel to the load bearing surface of the panel members, said securement means including a plurality of headed fasteners, said intermediate surface portions of the panel members and said offset surfaces of the channel members having a plurality of fastener holes formed therein to receive said headed fasteners therethrough, whereby the head portions of said fasteners are substantially flush with the load bearing surface of the panel members when said fasteners are secured to said vehicle frame.

4. The vehicle floor assembly of claim 3 wherein the offset surfaces of the channel members also have an alignment groove formed therein, said groove extending the length of said channel member and positioned substantially at the longitudinal center line of said offset surface, substantially midway between the support webs of said channel member, said intermediate surfaces of said panel members also having an alignment groove formed therein, said groove extending the length of said panel members and positioned substantially at the longitudinal center line of said intermediate surfaces.

5. In combination, a vehicle frame and floor construction, including:

A. a pair of main I-beams positioned in parallel spaced apart relationship, said beams having horizontally disposed upper and lower flange portions and a vertically disposed web portion connecting said flanges;

B. a plurality of central brace members secured to and between the web portions of the main I-beams in longitudinally spaced apart relationship along said main beams, the upper surfaces of said central brace members positioned below the upper flanges of the main I-beams;

C. a plurality of outboard brace members secured to and outwardly extending from opposite side web portions of the main I-beams in longitudinally spaced apart relationship along said main I-beams, the upper surfaces of said outboard brace members positioned below the upper flanges of the main I-beams;

D. a plurality of longitudinally extending panel members, said panel members having a load bearing surface and a pair of leg portions downwardly extending on opposite longitudinal sides of the load bearing surface, said leg portions having a length substantially equal to the spacing between the upper surfaces of the central and outboard brace members and the upper flanges of the I-beams said leg portions contacting the upper surfaces of the central and outboard channel members, the leg portions including an outwardly extending lateral flange formed in parallel spaced relationship to the load bearing surface of said panel members, said lateral flange also including an upwardly extending shoulder portion at the outermost edge of the flange upper bearing surface, said panel members positioned in side by side parallel spaced apart relationship, those panel members abutting the main I-beams having their respective flange portions positioned beneath the upper flanges of said I-beams whereby the load bearing surface of said panel is substantially flush with the upper flanges of said main I-beams;

E. a plurality of longitudinally extending channel members having an upper surface and a pair of locking webs downwardly extending on opposite sides of said upper surface, said locking webs positioned upon the lateral flanges of adjacent panel members whereby lateral movement between adjacent panel members is prevented, wherein the channel members include a pair of support webs depending downwardly from the upper surface of the channel member in spaced apart relationship intermediate the locking webs of said channel member, and extending a greater length than said locking webs, whereby, said support webs contact the vehicle frame when said locking webs are in bearing contact with the lateral flanges of adjacent panel members; and F. means for securing the panel members and the channel member to the central channel and outboard brace members wherein the securement means includes a plurality of headed fasteners extending through the upper surface of said panel and channel members and lockably secured to the vehicle frame.

6. The combined vehicle frame and floor construction of claim 5 wherein the main I-beams, the central brace members, the outboard brace members, the panel members and the channel members are constructed of aluminum alloy.

7. The combined vehicle frame and floor construction of claim 5 wherein the securement means includes a plurality of headed fasteners.

8. The combined vehicle frame and floor construction of claim 5 including a plurality of longitudinally extending wooden floor planks generally rectangular in cross-section and having a thickness substantially equal to that of the panel members, said plank members also having longitudinally extending, cut-out portions formed on diagonally opposite corners thereof, said cut-out portions having a height substantially equal to that of the flange portions of said panel members, whereby said plank members are adapted to matingly engage adjacent flanges of said panel members and, likewise, adapted to matingly fit beneath the upper flanges of said main I-beams.

* * * * *

UNITED STATES PATENT OFFICE
CERTIFICATE OF CORRECTION

PATENT NO. : 3,909,059
DATED : September 30, 1975
INVENTOR(S) : Arthur C. Benninger et al.

It is certified that error appears in the above-identified patent and that said Letters Patent are hereby corrected as shown below:

Column 4 Line 23 "peace" should read --place--.

Claim 5 - Column 9 Line 23 "member" should read --members--.

Signed and Sealed this thirtieth Day of December 1975

[SEAL]

Attest:

RUTH C. MASON
Attesting Officer

C. MARSHALL DANN
Commissioner of Patents and Trademarks